(12) United States Patent
Dorai et al.

(10) Patent No.: US 8,615,588 B2
(45) Date of Patent: Dec. 24, 2013

(54) ACCELERATE COPYING OF VIRTUAL MACHINE IMAGES

(75) Inventors: Chitra Dorai, Chappaqua, NY (US); John Fortelny, Silverdale, WA (US); William J. Hladik, Jr., Harrisburg, NC (US); Rajeev Puri, Huntersville, NC (US); Anees A. Shaikh, Yorktown Heights, NY (US); Kunwadee Sripanidkulchai, Bangkok (TH); Mark W. Zeininger, Torrington, CT (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/010,278

(22) Filed: Jan. 20, 2011

(65) Prior Publication Data

US 2012/0192175 A1 Jul. 26, 2012

(51) Int. Cl.
*G06F 15/173* (2006.01)
(52) U.S. Cl.
USPC .................................................... 709/226
(58) Field of Classification Search
USPC ............................................... 709/226
See application file for complete search history.

(56) References Cited

U.S. PATENT DOCUMENTS

| | | | |
|---|---|---|---|
| 2007/0094348 A1* | 4/2007 | Scheidel et al. | 709/217 |
| 2009/0210873 A1* | 8/2009 | Cuomo et al. | 718/1 |
| 2009/0222474 A1* | 9/2009 | Alpern et al. | 707/102 |
| 2009/0328030 A1* | 12/2009 | Fries | 717/174 |
| 2010/0332818 A1* | 12/2010 | Prahlad et al. | 713/150 |

* cited by examiner

*Primary Examiner* — Larry Donaghue
(74) *Attorney, Agent, or Firm* — Yee & Associates, P.C.

(57) ABSTRACT

A system, program product, and method are provided for copying a virtual machine image. An image library comprising a plurality of system images is provided by a target data processing system. A source image selection is received at the target data processing system. A given image from the image library is selected by the target system based on the received source image. The selected given image is transformed into a copy of the virtual machine image by receiving blocks from a source system that are part of the virtual machine image but not a part of the selected given image, such that only the blocks missing from the selected given image are transferred from the source system to the target system in order to form the copy of the virtual machine image. The source image is preferably a virtual data processing system image.

21 Claims, 5 Drawing Sheets

ACCELERATE COPYING OF VIRTUAL MACHINE IMAGES

BACKGROUND

1. Field

The disclosure relates generally to efficiently copying data in a data processing system and more specifically to replicating high capacity virtual machine images.

2. Description of the Related Art

A data center is a facility used to house computer systems and associated components, such as telecommunications and storage systems. It generally includes redundant or backup power supplies, redundant data communications connections, environmental controls (e.g., air conditioning, fire suppression) and security devices. The equipment may be used to operate and manage an entities' telecommunication network, provide data center based applications directly to the entities' customers, provide hosted applications for a third party to provide services to their customers, or provide a combination of these and similar data center applications.

Virtual data processing systems (sometimes called system virtual machines or hardware virtual machines) allow the sharing of the underlying physical machine resources between different virtual machines, each running its own operating system. The software layer providing the virtualization is called a virtual machine monitor or hypervisor. A hypervisor can run on bare hardware (Type 1 or native VM) or on top of an operating system (Type 2 or hosted VM).

The main advantages of virtual data processing systems are: (1) multiple OS environments can co-exist on the same computer, in strong isolation from each other, (2) the virtual machine can provide an instruction set architecture (ISA) that is somewhat different from that of the real machine, and (3) application provisioning, maintenance, high availability and disaster recovery.

One of the most time consuming tasks when setting up a data processing system is the installation and configuration of all the different software programs that will run on a given system, such as the operating system and application programs. Entities who continually configure systems usually install the software using a pre-configured operating system image. Installation from an operating system image significantly reduces the time required to either setup up a new data processing system (virtual or physical), or newly reconfigure an preexisting system to a new operating environment to provide new or upgraded functionality.

There may be instances when it is desirable to re-locate the functionality being provided by a given virtual data processing system, such as when a new data center is brought on-line at another physical location in order to be in closer physical proximity to end-users who are using the services provided by a given data center. Other scenarios for which a copy of a given virtual data processing system may be desired include virtual machine provisioning, cloning a virtual machine to a different storage device, cloning a virtual machine for a system health check, a backup/restore of a virtual machine, a storage hardware upgrade, or a hypervisor hardware upgrade without shared storage. However, today's data centers and associated virtual data processing systems typically utilize enormous data storage capacity, such as multi-gigabyte and even multi-terabyte capacities. The transfer of data between multiple data centers in order to replicate or relocate functionality from one data center to another can be difficult, requiring use of high-speed networks or physically relocating large and bulky storage devices between such data centers.

It would thus be desirable to provide an improved technique for relocating or replicating data from one data center to another, and it would be particularly advantageous to relocate or replicate system image data from a virtual data processing system to another virtual data processing system that is physically remote from the virtual data processing system.

SUMMARY

According to one embodiment of the present invention, there is provided a system, program product, and method for copying a virtual machine image. An image library comprising a plurality of system images is provided. A source image selection is received. A given image from the image library is selected based on the received source image selection. The selected given image is transformed into a copy of the virtual machine image.

DETAILED DESCRIPTION

Figure 1:
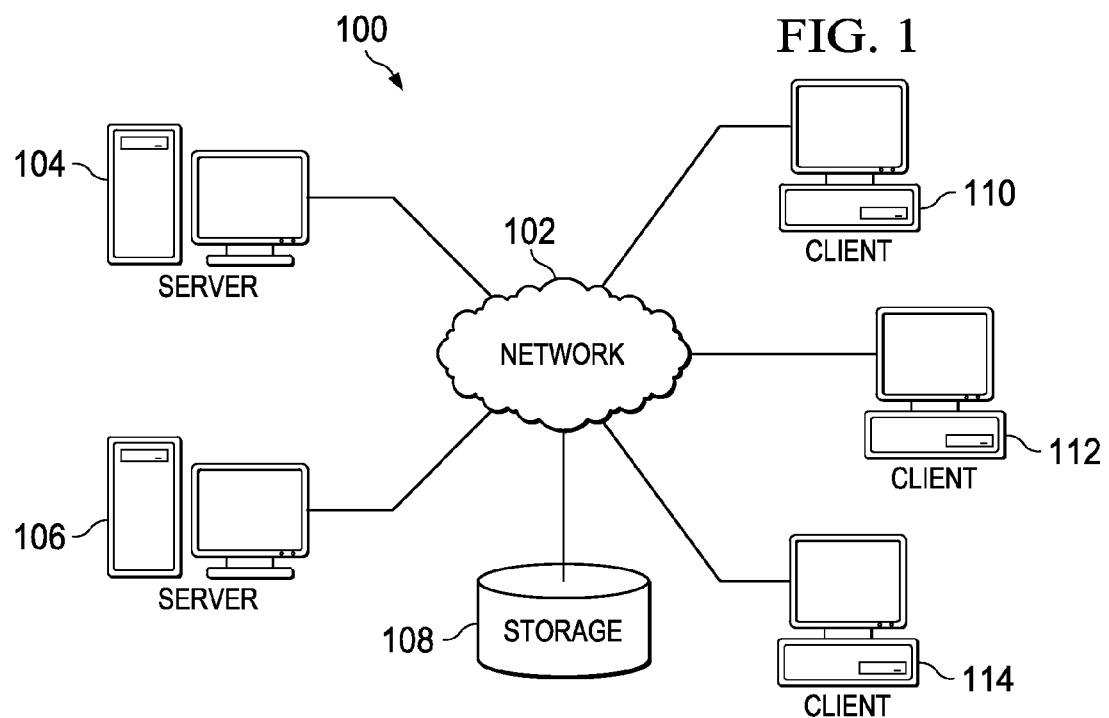
FIG. 1 depicts a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
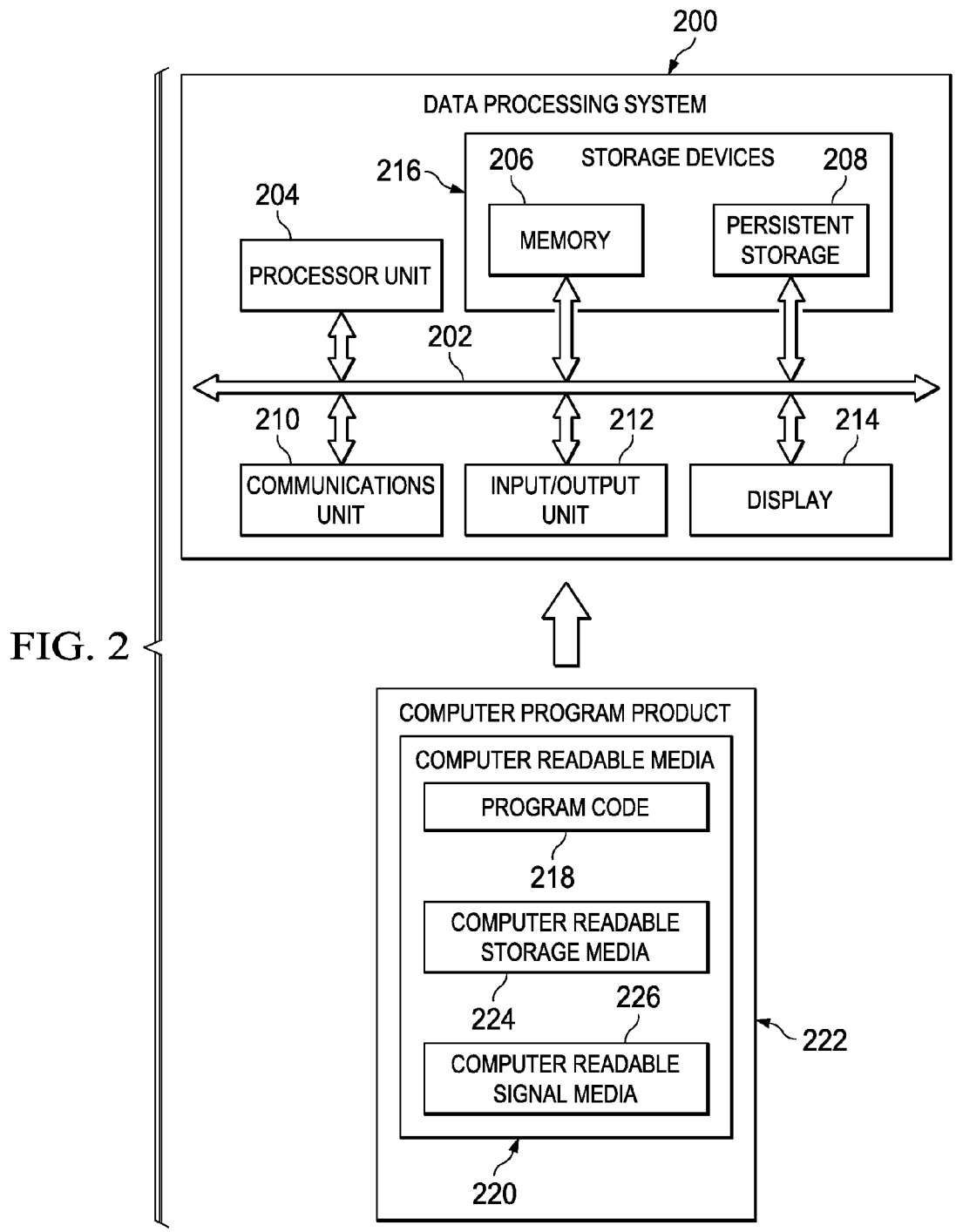
FIG. 2 is an illustration of a data processing system is depicted in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display x14 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

According to one embodiment of the present invention, there is provided a system, program product, and method for copying virtual machines images. An image library comprising a plurality of system images is provided. A source image selection is received. A given image from the image library is selected based on the received source image selection. The selected given image is transformed into a copy of a desired source image. The source image is preferably a virtual machine data processing system image, and the plurality of system images are golden virtual operating system images that may have been provisioned.

Figure 3:
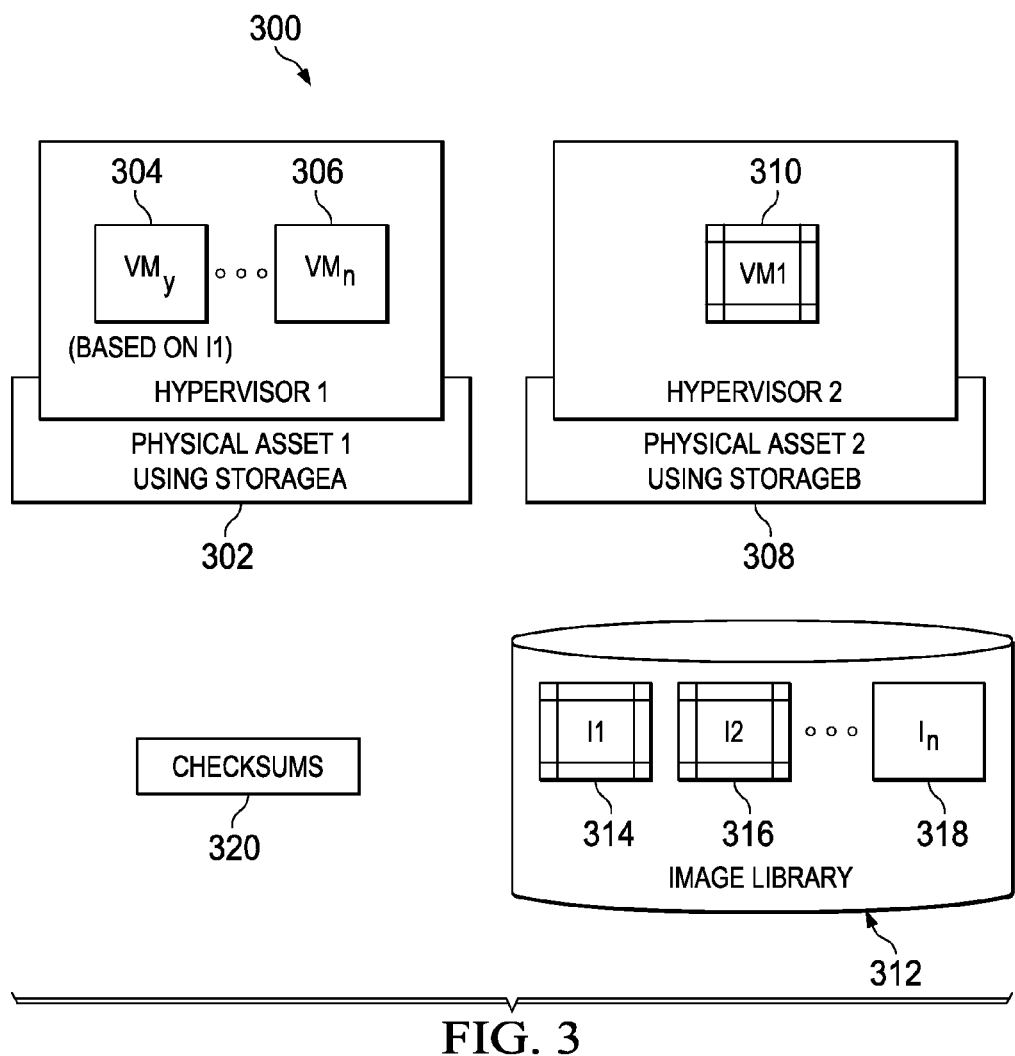
FIG. 3 depicts a system overview of a preferred embodiment that is operable in creating a copy of a virtual machine image.

Turning now to FIG. 3, there is shown at 300 a system overview of a preferred embodiment that is operable in creating a copy of a virtual machine image. There is a physical asset 1 that uses storage device StorageA that is depicted at 302. This physical asset 1 is a server data processing system such as server system 104 of FIG. 1, and is a part of a local data center. Such server data processing system 302 has a plurality of virtual machine instantiations $VM_1$-$VM_N$ running thereon, such as, elements 304 and 306, under supervision of Hypervisor 1 as is known in the art. Storage device StorageA that is depicted at 302 in FIG. 1 is not necessarily a dedicated storage device for physical asset 1, but can be shared by other physical assets as well, such as being shareably connected to a network as depicted by element 108 of FIG. 1.

At a remote or target location such as at another data center, there is a similar physical asset 2 that uses storage device StorageB that is depicted at 308. This is where a copy of a virtual machine such as virtual machine 304 or 306 is desired to be created, such that the functionality provided by virtual machine 304 or 306 can be provided at this remote data center. Storage device StorageB that is depicted at 308 in FIG. 1 is not necessarily a dedicated storage device for physical asset 2, but can be shared by other physical assets as well, such as being shareably connected to a network as depicted by element 108 of FIG. 1.

Also shown in FIG. 3 is an image library 312 having a plurality of system images $I_1$-$I_n$ 314, 316 and 318 stored therein, with such image library 312 being located at the remote data center in a preferred embodiment. Also in a preferred embodiment, these system images $I_1$-$I_n$ 314, 316 and 318 are master or golden system images for respective virtual machine operating systems, which may or may not be provisioned. Server provisioning is a set of actions taken to prepare a server with appropriate systems, data and software, and make it ready for operation. Typical tasks when provisioning a server are: select a server from a pool of available servers, load the appropriate software (operating system, device drivers, middleware, and applications), appropriately customize and configure the system and the software to create or change a boot image for this server, and then change its parameters. After these actions are performed, the system is restarted and the new software is loaded in order to makes the system ready for operation. Once provisioned, an image of such provisioned system can be obtained, and used to clone or replicate this provisioned image in other systems to avoid having to manually provision each system individually. This is particularly useful when multiple systems such as multiple virtual machines essentially provide a same set of services as others of the multiple systems. Again, the system images $I_1$-$I_n$ 314, 316 and 318 of FIG. 3 may or may not be provisioned accordingly.

The image library 312 can be on its own data processing system, or can be co-located on the hypervisor. While not shown in FIG. 3, the data center that includes server data processing system 302 could also have an image library similar to image library 312 if the local data center itself has capabilities for creating a copy of a virtual machine image in similar fashion to the replication capabilities described herein with respect to the remote data center—from either the remote data center depicted in FIG. 3 or yet another data center (not shown).

Also shown in FIG. 3 is a metadata store 320 that contains a set of checksums. This set of checksums includes calculated checksums for all units of disk content for each of the provisioned virtual machines $VM_1$-$VM_n$, and for all units of disk content for each of the respective images $I_1$-$I_n$ in the image library 312 at the remote data center. Content on the disk is divided into smaller units of disk content which are referred to as disk blocks. The division may be based on fixed-size units or variable-size units such as based on units of files determined by scanning the file system used by virtual machines $VM_1$-$VM_n$ or images $I_1$-$I_n$. This metadata store of checksums 320 is used to select a given image from image library 312 that will be used as the base, or starting point, from which a copy of a given source virtual machine will be created, as further described below. The metadata store 320 can be stored on a separate data processing system, a virtual machine management system, or can be co-located on hypervisor 1 at the local data center.

While not shown in FIG. 3, the remote data center that includes server data processing system 308 could also have a metadata store similar to metadata store 320 if the remote data center itself has virtual machine images that need to be copied to other data centers. In that case, the remote data center metadata store (not shown) would include calculated checksums for all units of disk content for each of the provisioned virtual machines on its remote system(s), and for all units of disk content for each of the respective images in an image library where a copy of the virtual image is to be created at yet another data center. In effect, each of a plurality of data centers could have a locally maintained image library and metadata store that function in similar fashion to image library 312 and metadata store 320, however such is not shown for purposes of clarity in not replicating duplicate functionality.

In one embodiment, the checksums for the local or source virtual machine are maintained by physical asset 1 and the checksums for the virtual machines and images in the remote or target server center are maintained by physical asset 2. The checksums for the source images $VM_1$-$VM_n$ are sent by system 302 to system 308. System 308 performs a comparison to identify if any of the checksums it received are already present at system 308. System 308 stores as meta-data the association between the checksum mapped to a unique unit of content (say, a block) which is then associated with one or more images that use that block. The checksums for system images $I_1$-$I_n$ maintained in image library 312 at the remote data center are sent by system 308 to system 302.

Figure 4A:
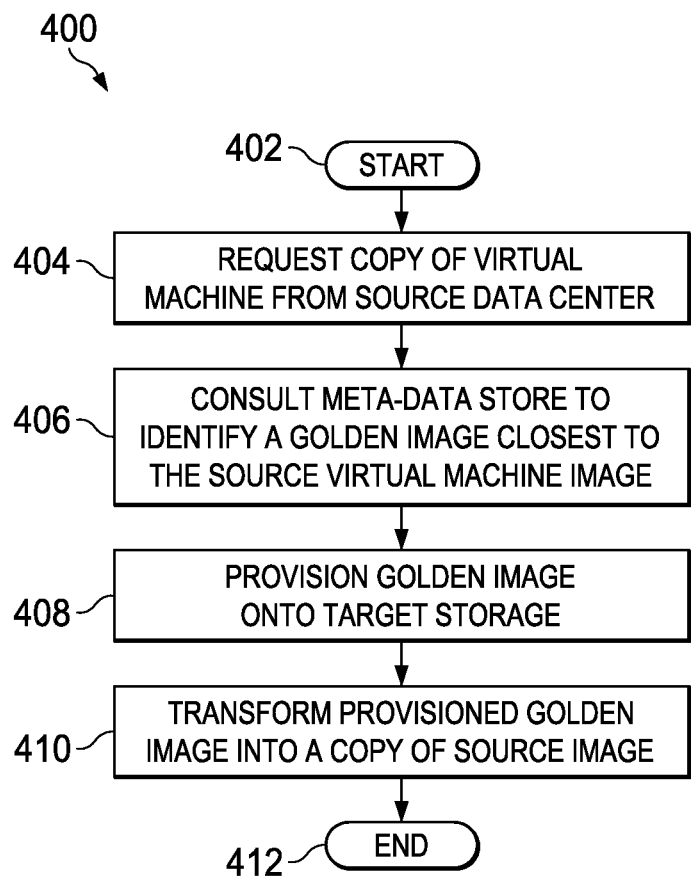
FIG. 4A depicts a preferred methodology that creates a copy of a virtual machine image without requiring that an entire copy of the virtual machine image be copied across a network, or physically transported to another machine/data center.

Turning now to FIG. 4A, there is depicted a flowchart 400 that depicts a preferred methodology that creates a copy of a virtual machine image without requiring that an entire copy of the virtual machine image be copied across a network, or physically transported to another machine/data center. The process starts at step 402, and proceeds to step 404 where a copy of a virtual machine from a source data center, such as one of elements 304-306 of FIG. 3, is requested. Such request could be generated by a user at data processing system 302. A metadata store, such as metadata store 320 that includes a plurality of checksums, is consulted to identify which one of a plurality of master or golden images maintained in image library 312 at the remote data center is the closest to the requested source virtual machine maintained in the local data center at step 406. The closest golden image is provisioned at step 408. This is a standard provisioning that occurs in the target virtual environment, such as through a virtual machine management system or an application programming interface (API) exposed by such system, or via command line. Processing proceeds to step 410 where the identified golden image is transformed into a copy of the requested source image, as will be further described below with respect to FIG. 6. Processing then ends at step 412.

Figure 4B:
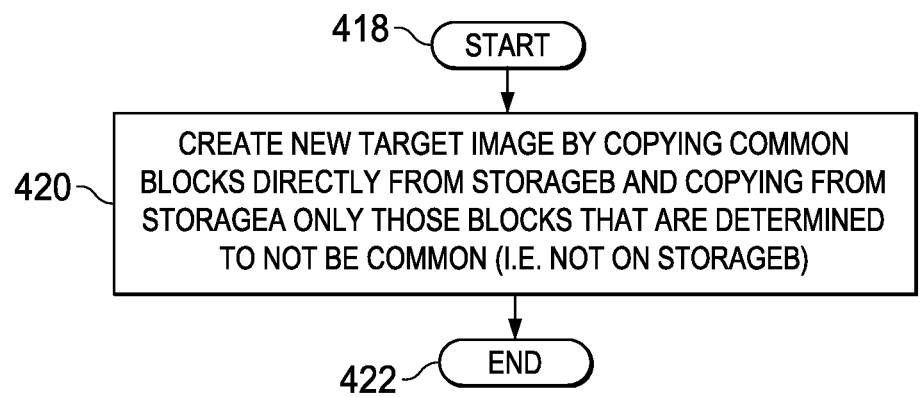
FIG. 4B depicts the processing that occurs when either (i) there is no image library, or (ii) a golden image that is identified as being closest to the requested source virtual machine has not been provisioned.
Figure 5:
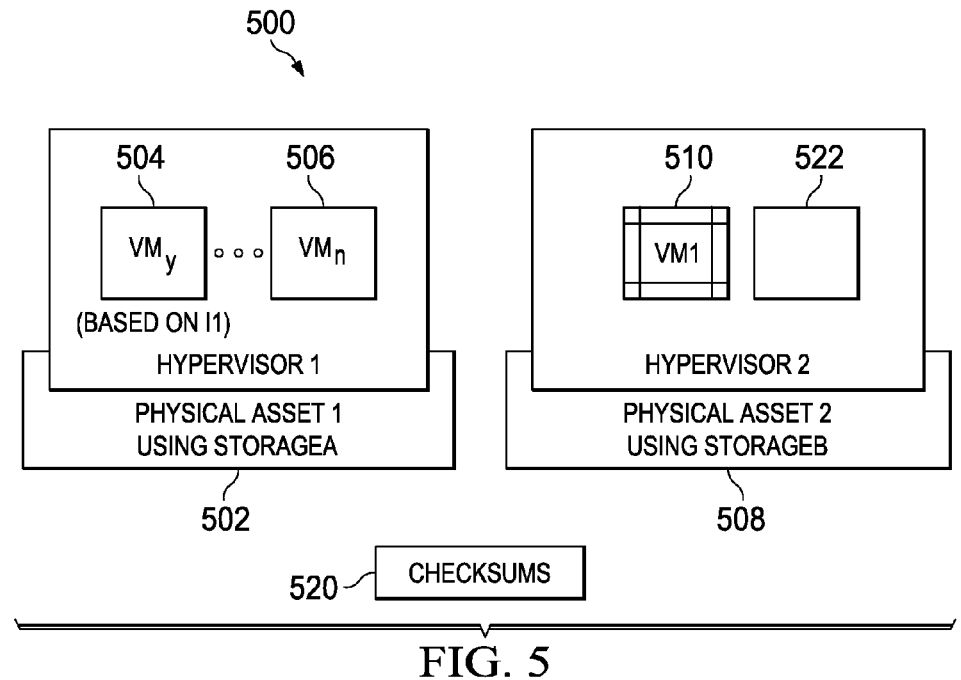
FIG. 5 a system overview of an embodiment that is operable in creating a copy of a virtual machine image where an image library does not exist.

Turning now to FIG. 4B, this figure depicts the processing that occurs when either (i) there is no image library (such as image library 312 of FIG. 3) at the remote data center where a virtual image copy is desired to be created, or (ii) no golden image maintained in image library 312 at the remote data center can be identified as being close to the requested source virtual machine and cannot be provisioned in step 408 in FIG. 4A. In this scenario, a target image that will be a copy of a desired source virtual machine is created from units of content such as disk blocks already existing on a target storage device. For example, as depicted in FIG. 5, there is shown at 500 a system for which an image library, such as image library 312 of FIG. 3, does not exist. This system 500 is similar to system 300 of FIG. 3, and includes at 502 a physical asset 1 that uses storage device StorageA. This physical asset 1 is a server data processing system such as server system 104 of FIG. 1. Such server data processing system 502 has a plurality of virtual machine instantiations $VM_1$-$VM_N$ running thereon, as shown be elements 504 and 506, under supervision of Hypervisor 1, in similar fashion to that shown in FIG. 3 with respect to the Physical Asset 1 302. At a remote location, such as at another data center, there is a similar physical asset 2 that uses storage device StorageB that is depicted at 508. This is where a copy of virtual machine $VM_1$ 504 is desired to be created, such that the functionality provided by virtual machine such as $VM_1$ 504 can be provided at this remote data center. In this embodiment, there is a pre-existing virtual machine 522 that has previously been configured to run on Physical Asset 2 508. As will be further described below, the desired target image is depicted at 510. Also shown in FIG. 5 is a metadata store 520 containing a set of checksums. This set of checksums includes calculated checksums for all units of disk content for each of the provisioned virtual machines $VM_1$-$VM_n$, and pre-existing virtual machines on the target physical asset 2 508 at the remote data center. Content on the disk is divided into smaller units of disk content which are referred to as disk blocks. The division may be based on fixed-size units or variable-size units such as based on units of files determined by scanning the file system used by virtual machines $VM_1$-$VM_n$ or pre-existing virtual machines on target physical asset 2 508 such as element 522. This metadata store of checksums 520 is used to identify blocks that are common to both the requested source virtual machine such as $VM_1$ 504 and blocks existing on StorageB.

Returning back to FIG. 4B, since there is no image library at the remote data center (or a golden image has been identified as being the closest has not been provisioned, as previously described hereinabove, a target image 510 is created using blocks copied from a pre-existing virtual machine 522 on the StorageB storage device. The blocks that are used are common blocks belonging to virtual machine 522 stored on StorageB and uncommon blocks from source virtual machine 504. Accordingly, at step 420 of FIG. 4B, a new target image 510 is created by copying common blocks directly from StorageB and copying from StorageA only those blocks that are determined to not be common—i.e., those blocks that are not on StorageB. In order to determine which blocks are uncommon, in one implementation, the source side sends the checksums of each block over to the target, and that target system compares these against checksums at the target system to determine uncommon blocks. The target system then requests that these determined uncommon blocks be sent to it by the source system. Thus, by copying only those blocks that are determined to not be common (also known as delta blocks), the amount of data needed to be remotely copied across a network is reduced by using local common blocks in the creation of target image 510. The process then ends at step 422.

Figure 6:
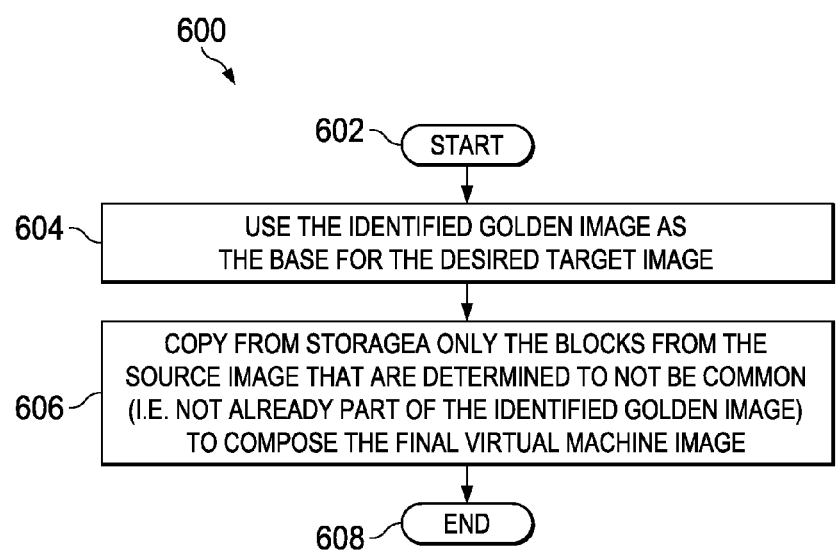
FIG. 6 depicts further details of step 410 of FIG. 4A that transforms an identified golden image into a desired target image that is a copy of a source image.

Turning now to FIG. 6, there is shown at 600 further details of step 410 of FIG. 4A that transforms an identified golden image from image library 312 of FIG. 3 into a desired target image at physical asset 2 308 of FIG. 3 that is a copy of a source image that exists on physical asset 1 302 of FIG. 3. The processing, which is performed at the remote data center where a copy of a virtual image is desired, starts at 602, and proceeds to step 604 where the identified golden image—as per step 406 of FIG. 4A—is used as the base or starting point for the desired target image, such as image 310 of FIG. 3. As previously described, this golden image was identified by system 302, and such identify has been communicated to system 308. Then, at step 606, blocks are received from StorageA—across a network—that are determined to not be common (i.e. those blocks that are not already part of the identified golden image that is used as the base), to compose the final virtual machine image 310 of FIG. 3.

There are many ways to perform the comparison. One embodiment of the comparison is as follows. The checksum of a block that is stored in the checksum store is indexed by the block ID and image or VM ID corresponding to the block belonging to that image or VM. When a copy is to be performed, the source hypervisor consults the checksum store. The checksum looks up all checksums belonging to the source VM block-by-block. For each block, it then looks up the checksum for the base image at the target for the same block position (block ID). The checksum store compares the two checksums. If they are the same, no work is performed. If they are different, the checksum store sends the corresponding block from storageA over the network to storageB to overwrite the existing block that was provisioned at the target.

For both types of systems, those with an image library such as element 312 of FIG. 3 and those without an image library as depicted in FIG. 5, each respective metadata store such as element 320 of FIG. 3 and element 520 of FIG. 5 is updated when blocks on the storage devices have changed, or on a scheduled regular basis.

In one embodiment, the source image and the 'base' set of blocks are the same size. If they are the same size, then the action is only to replace the blocks on the 'base' with blocks that are uncommon from the source. However, if the 'base' is smaller than the source, the 'base' is expanded by adding blocks to the end of the base image file until it is the same size as the source. If the base is larger than the source, the base is truncated by deleting blocks from the end of the base image file until it is the same size as the source.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for copying, to a destination data processing system, a virtual machine image that is installed and operable to run on a source data processing system, the method comprising steps of:
   providing an image library comprising a plurality of system images;
   receiving a source image selection;
   selecting a given image from the image library based on the received source image selection; and
   transforming the given image into a copy of the virtual machine image using the given image and the virtual machine image that is installed and operable to run on the source data processing system.

2. The method of claim 1, where transforming the given image comprises:
   determining at least one portion of the virtual machine image that is not contained within the given image; and
   copying the at least one portion of the virtual machine image from the source data processing system to the given image.

3. The method of claim 2, wherein copying the at least one portion comprises:
   receiving the at least one portion by a data processing element in the target data processing system from a data processing element in the source data processing system using a network.

4. The method of claim 1, wherein the image library is maintained at the target data processing system, and the source image selection is determined by the source data processing system.

5. The method of claim 1, wherein the virtual machine image is a virtual data processing system image.

6. The method of claim 1, wherein the virtual machine image comprises a virtual operating system, application programs and data.

7. The method of claim 1, wherein the plurality of system images are provisioned from a plurality of master system images.

8. A system for copying a virtual machine image, comprising a data processor coupled to a memory and operable to execute instructions in the memory to perform the steps of claim 1.

9. A computer program product comprising a computer readable storage device having stored thereon instructions that are operable for performing the steps of claim 1 when executed by a computer.

10. A method performed by a source data processing system for facilitating copying a virtual machine image maintained by the source data processing system to a target data processing system, comprising:
   the source data processing system accessing target metadata associated with a plurality of system images maintained by the target data processing system;
   the source data processing accessing source metadata associated with a plurality of virtual machines maintained by the source data processing system;
   responsive to receiving a request for a copy of the virtual machine image, the source data processing system determining which of the plurality of system images at the target data processing system most closely matches the virtual machine image by comparing (i) metadata from the source metadata that is associated with the source virtual machine image and (ii) the target metadata; and
   responsive to determining the closest matched system image, the source data processing system sending a source image selection to the target data processing system that identifies the closest matched system image.

11. The method of claim 10, wherein the plurality of virtual machines maintained by the source data processing system are installed and operable to run on the source data processing system, and wherein the virtual machine image is one of the plurality of virtual machines.

12. The method of claim 10, wherein the target metadata comprises a plurality of target checksums including a target checksum for each of the plurality of system images maintained by the target data processing system, and the source metadata comprises a source checksum for each of the plurality of virtual machines maintained by the source data processing system.

13. The method of claim 10, wherein a checksum for the requested virtual machine image is determined and compared with the plurality of target checksums to determine which of the plurality of system images most closely matches the virtual machine image.

14. The method of claim 10, further comprising:
the source data processing system determining which blocks of the virtual machine image are not common to blocks in the closest matched system image to form delta blocks;
the source data processing system sending the delta blocks to the target data processing system.

15. The method of claim 14, further comprising:
the target data processing system receiving the delta blocks and using the delta blocks in conjunction with the closest matched system image to form a copy of the virtual machine image.

16. A system for copying a virtual machine image, comprising a data processor coupled to a memory and operable to execute instructions in the memory to perform the steps of claim 10.

17. A computer program product comprising a computer readable storage device having stored thereon instructions that are operable for performing the steps of claim 10 when executed by a computer.

18. A method for copying a virtual machine image maintained by the source data processing system to a target data processing system, comprising:
the source data processing system accessing target metadata associated with a plurality of system images maintained by the target data processing system;
the source data processing accessing source metadata associated with a plurality of virtual machines maintained by the source data processing system;
responsive to receiving a request for a copy of the virtual machine image, the source data processing system determining which of the plurality of system images at the target data processing system most closely matches the virtual machine image by comparing (i) metadata from the source metadata that is associated with the source virtual machine image and (ii) the target metadata;
responsive to determining the closest matched system image, the source data processing system sending a source image selection to the target data processing system that identifies the closest matched system image;
the target data processing system providing an image library comprising the plurality of system images;
the target data processing system receiving the source image selection;
the target data processing system selecting a given image from the image library based on the received source image selection; and
the target data processing system transforming the given image into a copy of the virtual machine image.

19. The method of claim 18, wherein the target metadata comprises a plurality of target checksums including a target checksum for each of the plurality of system images maintained by the target data processing system, and the source metadata comprises a source checksum for each of the plurality of virtual machines maintained by the source data processing system.

20. The method of claim 18, further comprising:
the source data processing system determining which blocks of the virtual machine image are not common to blocks in the closest matched system image to form delta blocks;
the source data processing system sending the delta blocks to the target data processing system.

21. The method of claim 20, further comprising:
the target data processing system receiving the delta blocks and using the delta blocks in conjunction with the closest matched system image to form a copy of the virtual machine image.

* * * * *